(12) United States Patent
Sasaki et al.

(10) Patent No.: US 7,284,722 B2
(45) Date of Patent: Oct. 23, 2007

(54) INFORMATION RECORDING MEDIUM

(75) Inventors: Morimasa Sasaki, Tokyo (JP); Takateru Satoh, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/189,791

(22) Filed: Jul. 27, 2005

(65) Prior Publication Data

US 2006/0175451 A1    Aug. 10, 2006

Related U.S. Application Data

(60) Provisional application No. 60/649,614, filed on Feb. 4, 2005.

(51) Int. Cl.
*G11B 23/04* (2006.01)

(52) U.S. Cl. ............... 242/338.2; 242/338.3; 360/132

(58) Field of Classification Search ............ 242/338.1, 242/338.2, 338.3, 343, 343.1, 343.2; 360/132
See application file for complete search history.

(56) References Cited

U.S. PATENT DOCUMENTS

| | | | | |
|---|---|---|---|---|
| 4,742,418 A | * | 5/1988 | Tanaka et al. | 242/338.2 |
| 4,789,113 A | * | 12/1988 | Katagiri et al. | 242/338.2 |
| 4,862,305 A | * | 8/1989 | Katagiri et al. | 360/132 |
| 4,969,611 A | * | 11/1990 | Katagiri et al. | 242/338.3 |
| 5,451,007 A | * | 9/1995 | Sumida et al. | 242/343.2 |
| 5,647,550 A | * | 7/1997 | Sumida et al. | 242/343.2 |

FOREIGN PATENT DOCUMENTS

| | | |
|---|---|---|
| JP | 2000-137971 | 5/2000 |
| JP | 2001-312872 | 11/2001 |
| JP | 2004-220650 | 8/2004 |

OTHER PUBLICATIONS

English Language Abstract of JP 2000-137971.
English Language Abstract if JP 2001-312872.
English Language Abstract of JP 2004-220650.

* cited by examiner

*Primary Examiner*—William A. Rivera
(74) *Attorney, Agent, or Firm*—Greenblum & Bernstein, P.L.C.

(57) ABSTRACT

An information recording medium of the present invention includes a pair of tape reels around which a magnetic tape is wound, a case main body having first windows and second windows formed to the side walls thereof and rotatably accommodating the pair of tape reels, wherein the first windows cause detection light to enter the inside of the case main body to detect the tape ends of the magnetic tape and the second windows cause the detection light to outgo to the outside of the case main body, a front cover turnably attached to the case main body to open and close a drawing-out port of the magnetic tape; and a reel brake, and the reel brake includes a main body disposed to the case main body so as to slide along a direction in which the main body comes into contact with and separates from the tape reels, and arms formed to the main body as well as slinging the main portion by moving along the direction in which they come into contact with and separate from the tape reels between the first windows and the second windows as the front cover is turned to thereby regulate the rotation of the tape reels and release the regulated rotation of the tape reels.

2 Claims, 6 Drawing Sheets

INFORMATION RECORDING MEDIUM

CROSS-REFERENCE TO RELATED APPLICATIONS

This application claims the benefit of U.S. Provisional Application No. 60/649,614, filed Feb. 4, 2005.

BACKGROUND OF THE INVENTION

1. Field of the Invention

The present invention relates to an information recording medium including a pair of tape reels, a case main body for rotatably accommodating the tape reels, and a reel brake for regulating the rotation of the tape reels.

2. Description of the Related Art

The tape cartridge disclosed in Japanese Laid-Open Patent Publication No 2000-137971 is known as this type of the information recording medium. The tape cartridge includes a pair of reels around which a magnetic tape is wound, a shell, a rid (front cover), a slide shutter, a reel lock member, and a reel lock spring. The shell is composed of an upper half and a lower half and rotatably accommodate the respective reels, the rid is turnably attached to the front end surface of the shell and opens and closes a tape drawing-out pocket portion of the shell, the slide shutter opens and closes the bottom of the pocket portion, the reel lock member locks and unlocks the respective reels in association with the open/close operation of the rid, and the reel lock spring urges the reel lock member.

As a result of examination of the conventional tape cartridge, the inventors have found the following problems. That is, in a drive unit for driving this type of the tape cartridge, detection light is irradiated to the magnetic tape in the tape cartridge, and the tape ends of the magnetic tape are detected thereby. Accordingly, in this type of the tape cartridge, light entering holes for causing the detection light to enter the inside of the shell and light outgoing holes for causing the detection light to outgo to the outside of the shell are formed to the side walls of the shell. In this case, in this type of the tape cartridge, arms of the reel lock member, which is engaged with the rid, are disposed below both the holes so that the detection light, which enters and outgoes through both the holes is not cut off by the arms. Thus, when the rid is turned, the arms are engaged with the rid at the extreme ends thereof at positions far from the axis of rotation of the rid to thereby slide the reel lock member. In this case, the torque of the rid, which is necessary to slide the reel lock member against the urging force of the reel lock spring, increases with a longer distance from the axis of rotation of the rid to the positions where the arms are engaged with the rid. Accordingly, in the tape cartridge described above, it is difficult to smoothly open and close the rid due to the long distance from the axis of rotation of the rid to the positions where the arms are engaged with the rid. In contrast, when a shell having holes formed to side walls is injection molded, a slide metal mold having a slide core must be used. In this case, the manufacturing cost of the slide metal mold is more expensive than that of an ordinary metal mold having no slide core because the slide metal mold has a complex structure. As a result, it is difficult to reduce the manufacturing cost of the tape cartridge described above due to the expensive manufacturing cost of the metal mold.

SUMMARY OF THE INVENTION

A leading object of the present invention, which was made in view of the above problems, is to provide an information recording medium capable of smoothly opening and closing a front cover. Other object of the present invention is to provide an information recording medium capable of reducing a manufacturing cost.

To achieve the above object, an information recording medium of the present invention includes a pair of tape reels around which a magnetic tape is wound, a case main body having first windows and second windows formed to the side walls thereof and rotatably accommodating the pair of tape reels, wherein the first windows cause detection light to enter the inside of the case main body to detect the tape ends of the magnetic tape, and the second windows cause the detection light to outgo to the outside of the case main body, a front cover turnably attached to the case main body to open and close a drawing-out port of the magnetic tape; and a reel brake, and the reel brake includes a main body disposed to the case main body so as to slide along a direction in which the reel brake comes into contact with and separates from the tape reels, and arms formed to the main body as well as slinging the main portion by moving along the direction in which they come into contact with and separate from the tape reels between both the first and second windows as the front cover is turned to thereby regulate the rotation of the tape reels and release the regulated rotation of the tape reels.

In the information recording medium, the reel brake is arranged such that the arms move along the direction in which they come into contact with and separate from the tape reels between the first windows and the second windows. Accordingly, since the distance from the axis of rotation of the front cover to the extreme ends of the arms with which the reel brake is engaged can be shortened than the arrangement in which the arms are moved at positions nearer to, for example, the bottom plate side of the case main body than the first and second windows. As a result, the front cover can be smoothly turned.

In the information recording medium of the present invention, the first windows and the second windows form simple openings in association with one another, and the reel brake is arranged such that the arms move along the direction in which the arms come into contact with and separate from the tape reels at the positions where the openings are partitioned to first regions acting as the first windows and second regions acting as the second windows.

In the information recording medium, the first windows and the second windows form the simple openings in association with one another, and the reel brake is arranged such that the arms move along the direction in which they come into contact with and separate from the tape reels at the position where the first regions are partitioned from the second regions. Accordingly, when the case main body is composed of the lower case and the upper case, the openings through which detection light enters and outgoes can be formed of, for example, two cutout portions formed to each of the lower and upper cases. As a result, when the lower and upper cases are manufactured by, for example, injection molding, an ordinary metal mold having no slide core can be used. Since the ordinary metal mold can be manufactured in a less expensive cost than a special slide metal mold having a slide core, the manufacturing cost of the lower and upper cases can be reduced, thereby the manufacturing cost of the information recording medium can be reduced.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of an information recording medium according to the present invention will be explained below with reference to the attached drawings.

First, an arrangement of the information recording medium 1 will be explained with reference to the drawings.

Figure 1:
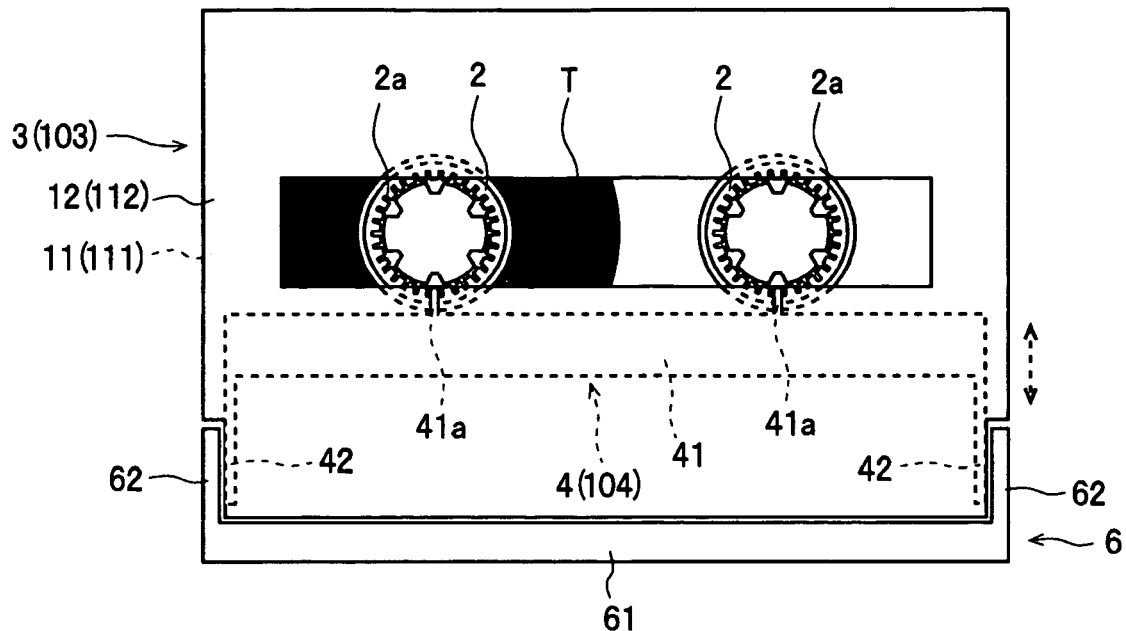
FIG. 1 is a plan view of an information recording medium.

The information recording medium 1 shown in FIG. 1 is a two-reel cartridge type information recording medium used as a storage device for backing up data recorded in, for example, a computer. As shown in the figure, the information recording medium 1 includes tape reels 2, 2 around which a magnetic tape T is wound, a case main body 3, a reel brake 4, a slide unit 5 (refer to FIG. 2), and a front cover 6.

Figure 2:
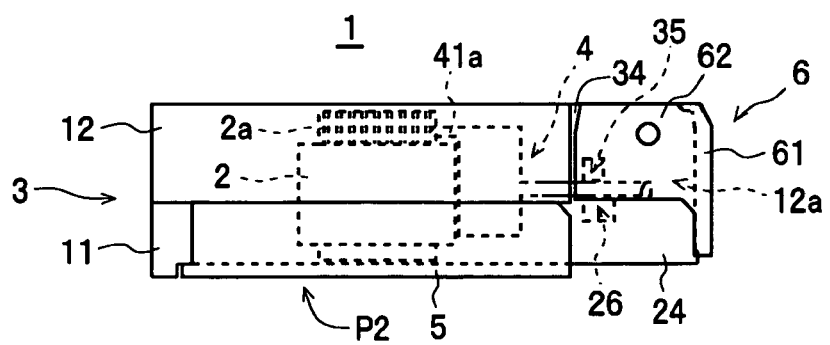
FIG. 2 is a side view of the information recording medium when it is viewed from one side surface.

As shown in FIGS. 1 and 2, the tape reels 2 are arranged to wind the magnetic tape T therearound and accommodated in the case main body 3. In this case, teeth portions 2a are respectively formed to ends (upper ends in FIG. 2) of the tape reels 2 so that the rotation of the tape reels 2 is regulated by projections 41a of the reel brake 4 engaged with the teeth portions 2a. Transparent or semitransparent leader tapes (not shown) are attached to both the ends of the magnetic tape T wound around the tape reels 2, respectively, and the ends of the leader tapes are fixed to the tape reels 2, 2, respectively.

Figure 3:
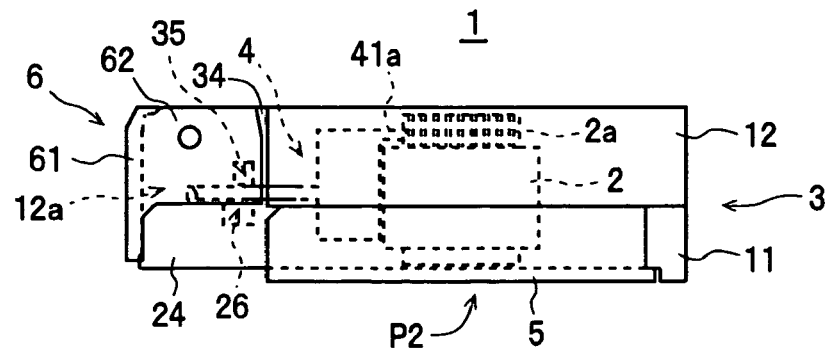
FIG. 3 is a side view of the information recording medium when it is viewed from the other side surface.
Figure 4:
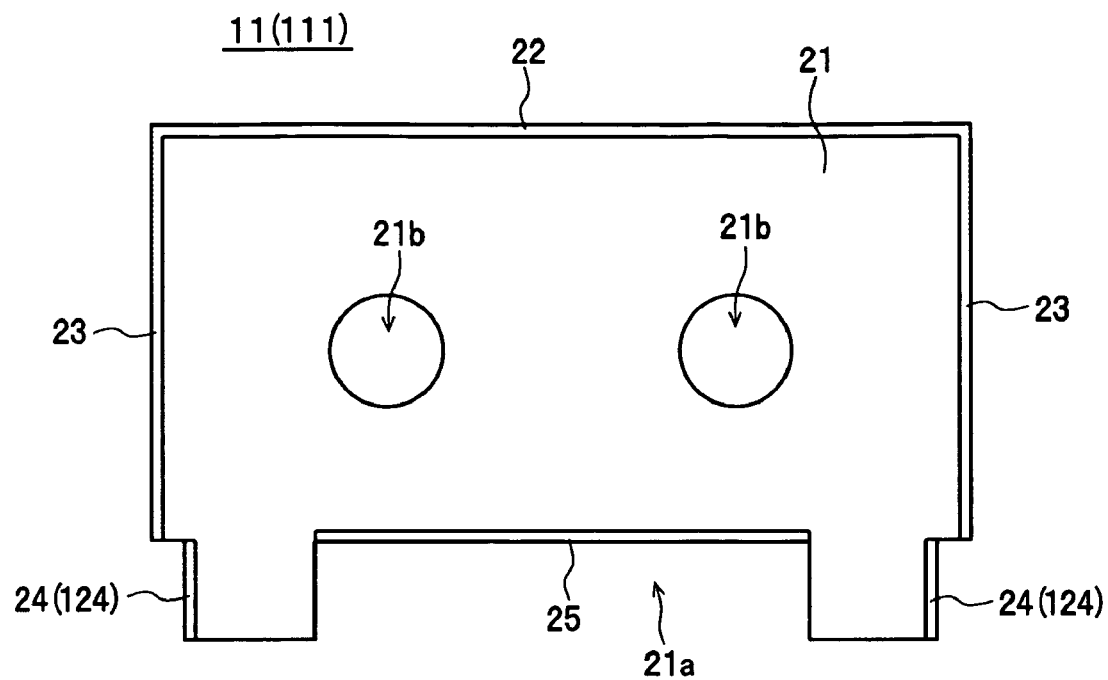
FIG. 4 is a plan view of a lower case.

As shown in FIG. 2, the case main body 3 is composed of a lower case 11 and an upper case 12 which can be engaged with each other, and the tape reels 2, 2 are rotatably accommodated in a space formed by engaging both the lower case and upper case 11 and 12 with each other. As shown in FIG. 4, the lower case 11 includes a bottom plate 21, a rear wall 22, side walls 23, 23, side walls 24, 24, and a front wall 25 and is formed in a shallow plate shape in its entirety. As shown in FIG. 4, the bottom plate 21 has a cutout portion 21a formed on the front surface side at the central portion thereof (lower side in FIG. 1) from which the information recording medium 1 is inserted into a drive unit. In this case, a magnetic tape drawing-out port of the present invention is formed of the cutout portion 21a and an opening 12a of the upper case 12 which will be described later. Further, the bottom plate 21 has circular insertion holes 21b, 21b formed therethrough so that drive shafts of the drive unit are inserted thereinto. The rear wall 22, the side walls 23, 23, the side walls 24, 24, and the front wall 25 are standingly provided along the edges of the bottom plate 21. Further, as shown in FIGS. 2 and 3, the side walls 24, 24 have windows 26 (first windows in the present invention) formed thereto, and each of the windows 26 is composed of a rectangular hole. In this case, the windows 26 cause detection light, which is emitted from a tape end detector of the drive unit for detecting the tape ends of the magnetic tape T, to enter the inside of the case main body 3.

Figure 5:
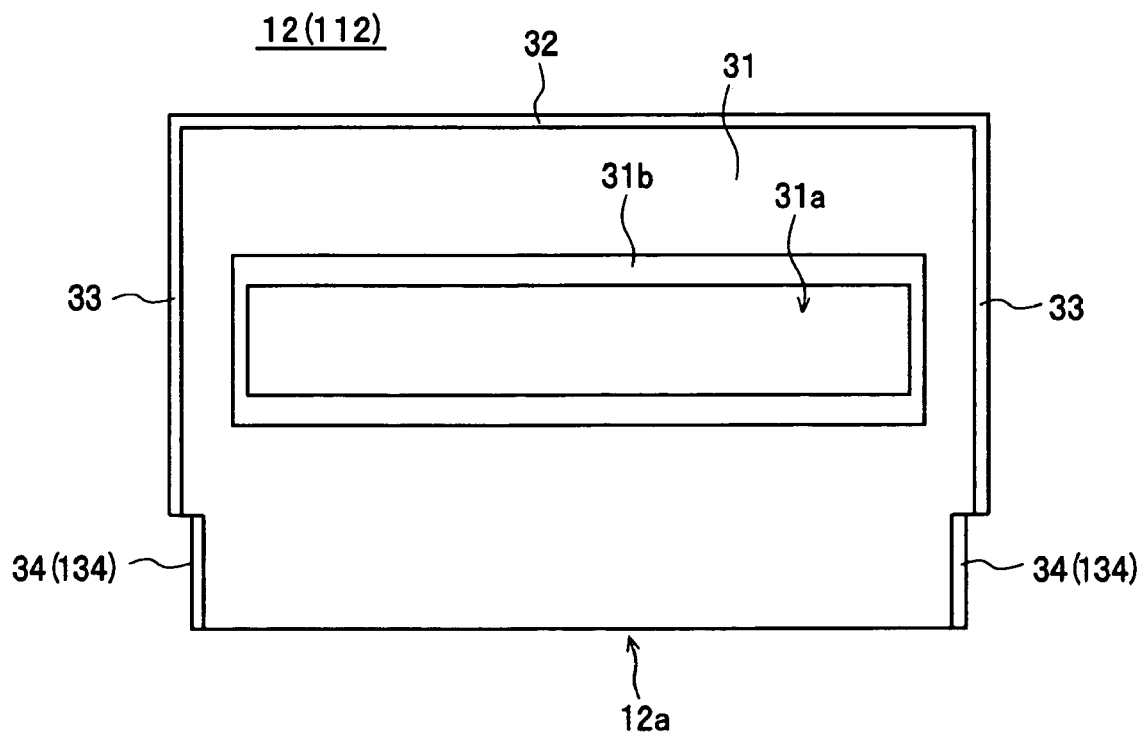
FIG. 5 is a plan view of an upper case.

As shown in FIG. 5, the upper case 12 has a top plate 31, a rear wall 32, side walls 33, 33, and side walls 34, 34 and is formed in a shallow plate shape having the opening 12a on a front surface side from which the upper case 12 is inserted into the drive unit. The top plate 31 is formed in a rectangular shape in its entirety. Further, a rectangular top window 31a is formed at the central portion of the top plate 31 and has a transparent (or approximately transparent) cover 31b attached thereto. The rear wall 32, the side walls 33, 33, and the side walls 34, 34 are standingly provided along the edges of the top plate 31, respectively. Further, as shown in FIGS. 2 and 3, the side walls 34, 34 have windows 35 (second windows in the present invention) formed thereto, respectively, and each of the window portions 35 is composed of a rectangular hole. In this case, the windows 35 causes the detection light, which enters from the windows 26 of the lower case 11 and whose light path is changed to an inverted-U-shape by a prism (not shown) disposed in the lower case 11 or the upper case 12, to outgo to the outside of the case main body 3.

Figure 6:
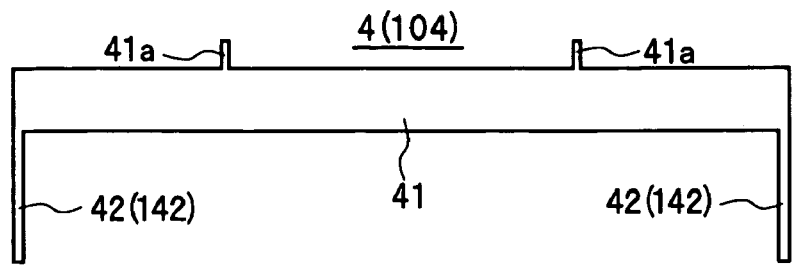
FIG. 6 is a plan view of a reel brake.
Figure 11:
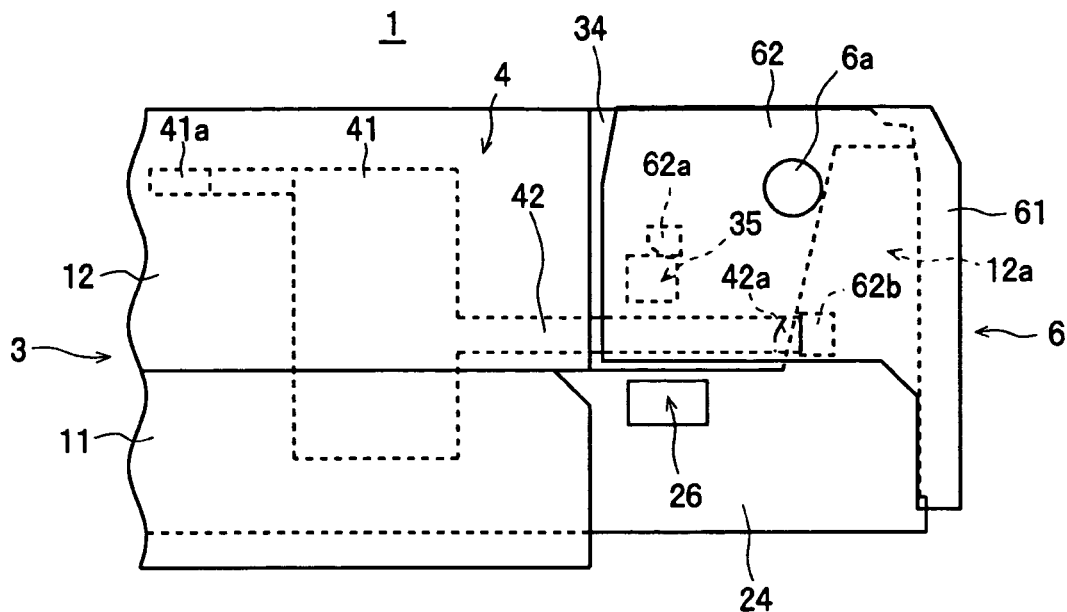
FIG. 11 is a side view of the information recording medium in the unused state.
Figure 12:
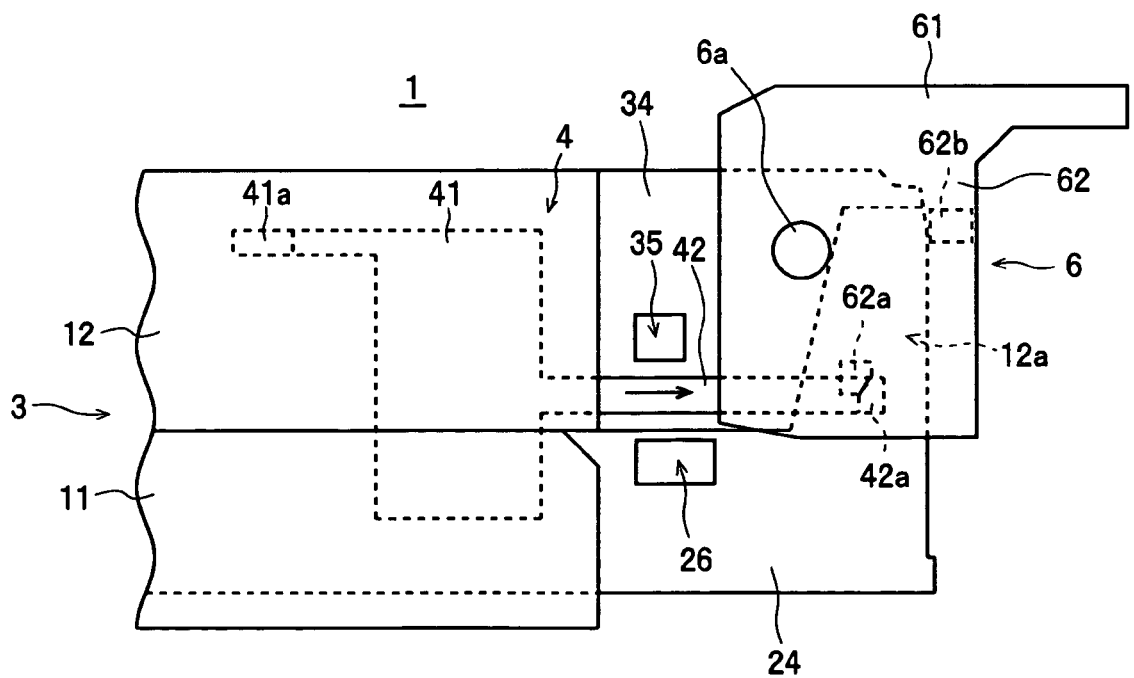
FIG. 12 is a side view of the information recording medium in the used state.

As shown in FIG. 6, the reel brake 4 includes a main portion 41 and arms 42, 42. As shown in FIG. 1, the main portion 41 is disposed in the case main body 3 so that the main portion 41 can slide along a direction in which the main portion 41 comes into contact with and separates from the tape reels 2, 2. Further, the main portion 41 has the two projections 41a, 41a formed thereto. In this case, when the main portion 41 is located in close proximity to the tape reels 2, 2, the projections 41a, 41a are engaged with the teeth portions 2a of the tape reels 2, 2, respectively to thereby regulate the rotation of the tape reels 2, 2. Further, when the main portion 41 separates from the tape reels 2, 2, the projections 41a, 41a are disengaged from the teeth portions 2a of the tape reels 2, 2 to thereby release the regulated rotation of the tape reels 2, 2. As shown in FIG. 6, the arms 42, 42 project from both the ends of the main portion 41, respectively. In this case, as shown in FIGS. 11 and 12, when the front cover 6 is turned, projections 42a formed at the extreme end of the arms 42, 42 are engaged with projections 62a, 62b of the front cover 6 (refer to FIG. 8) and moved as the front cover 6 is turned. Accordingly, the arms 42, 42 slide the main portion 41 along the direction in which the main portion 41 comes into contact with and separates from the tape reels 2, 2. As shown in FIGS. 11 and 12, the length and the position of the arms 42, 42 are defined such that they move along the side walls 34, 34 between the windows 26 formed to the side walls 24, 24 of the lower case 11, respectively and the windows 35 formed to the side walls 34, 34 of the upper case 12, respectively, that is, along the direction in which the arms 42, 42 come into contact with and separate from the tape reels 2, 2.

Figure 7:
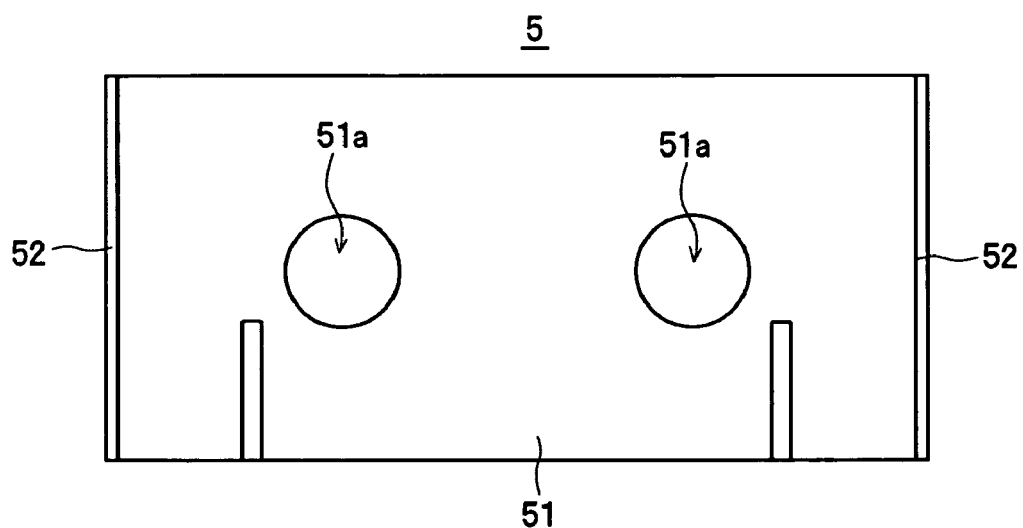
FIG. 7 is a plan view of a slide portion.
Figure 8:
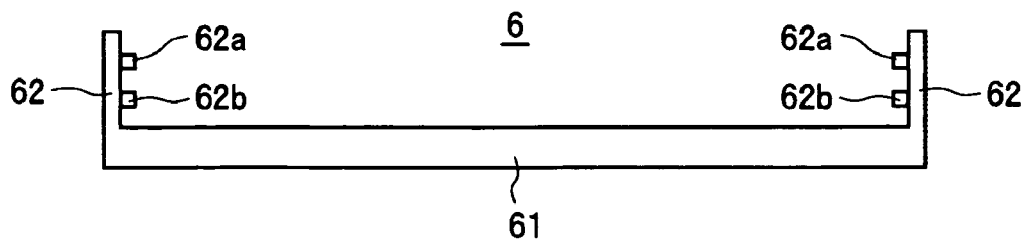
FIG. 8 is a plan view of a front cover.
Figure 9:
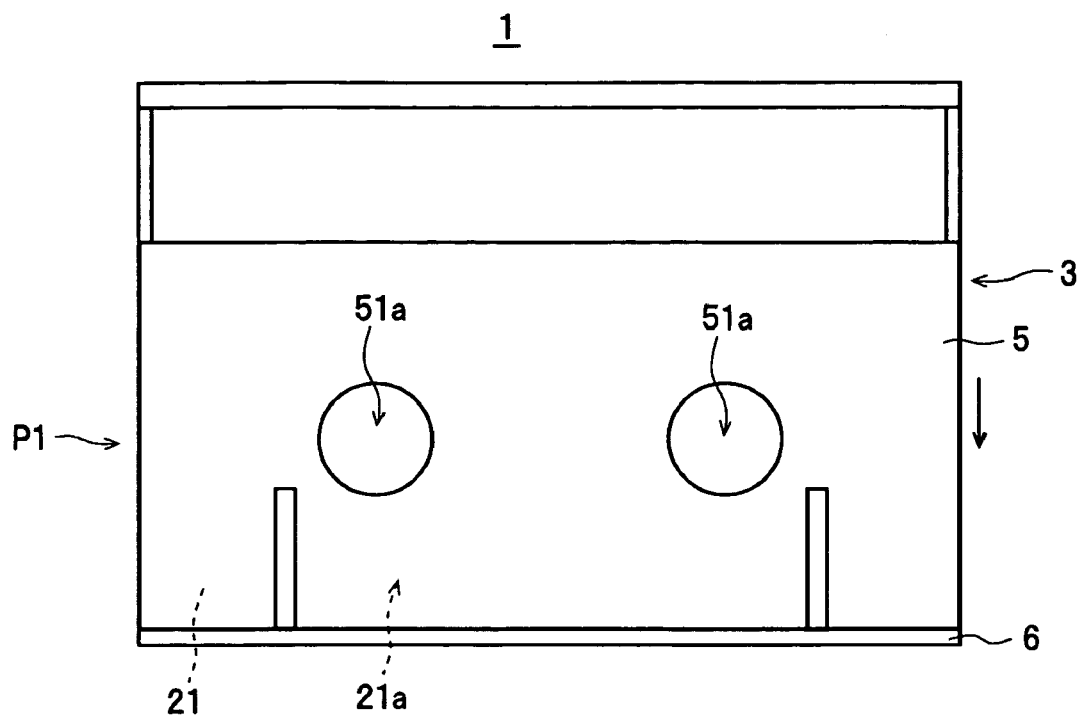
FIG. 9 is a plan view of the information recording medium in an unused state when it is viewed from a rear surface side.
Figure 10:
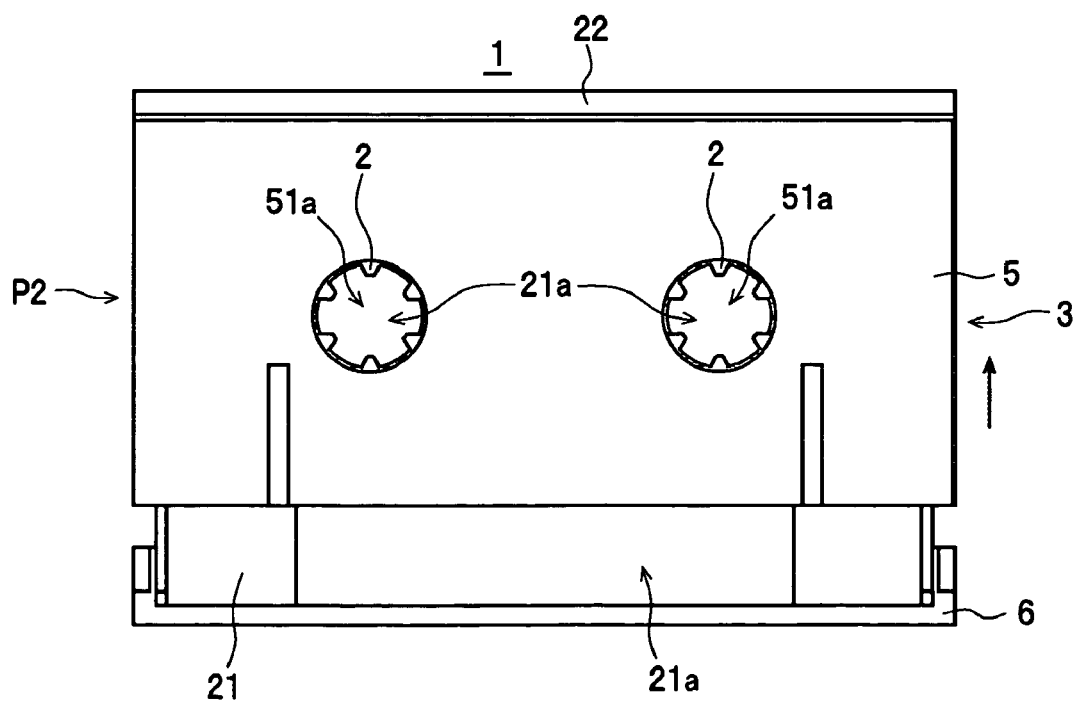
FIG. 10 is a plan view of the information recording medium in a used state when it is viewed from the rear surface side.

As shown in FIG. 7, the slide unit 5 includes a main portion 51 and side walls 52, 52. The main portion 51 is formed in a rectangular plate shape. Further, the main portion 51 has circular insertion holes 51a, 51a formed thereto so that the drive shafts of the drive unit are inserted thereinto. The side walls 52, 52 are standingly provided along both the edges of the main portion 51. In this case, as shown in FIGS. 2, 9, and 10, the slide unit 5 is slidably engaged with the lower case 11. As shown in FIG. 8, the front cover 6 includes a main portion 61, and support portions 62, 62 formed at both the ends of the main portion 61. The support portions 62, 62 have projections 62a, 62b formed thereto, respectively. In this case, as shown in FIGS. 1 and 2, the front cover 6 is attached in the vicinity of the opening 12a (refer to FIG. 5) of the side walls 34, 34 of the upper case 12 so that the support portions 62, 62 can be turned, and when the support portions 62 are turned by the drive unit, the main portion 61 opens and closes the opening 12a. When the front cover 6 is turned, the projections 62a, 62b of the support portions 62 are engaged with the projections 42a at the extreme ends of the arms 42 of the reel brake 4 and move the arms 42, 42, thereby the main portion 41 (reel brake 4) is slid along the direction in which the main portion 41 (reel brake 4) comes into contact with and separate from the tape reels 2, 2.

Next, the operation of the information recording medium 1 when data is recorded or reproduced will be explained with reference to the drawings.

When the information recording medium 1 is taken out from the drive unit(not shown), that is, when the information recording medium 1 is not used, the main portion 41 of the reel brake 4 is caused to be located in proximity to the tape reels 2, 2 by the urging force of a spring (not shown) as shown in FIGS. 1 and 2. Accordingly, the projections 41a, 41a of the main portion 41 are engaged with the teeth portions 2a of the tape reels 2, 2, respectively to thereby regulate the rotation of the tape reels 2, 2. As shown in FIG. 9, the slide unit 5 is located at a position P1 on the front cover 6 side of the case main body 3. In this state, the front cover 6 closes the opening 12a of the upper case 12 of the case main body 3 as shown in FIG. 2.

In contrast, when the information recording medium 1 is inserted from an insertion port of the drive unit toward a loading portion, the loading portion draws the information recording medium 1 thereinto. At the time, the information recording medium 1 is drawn in the state in which the bottom surface of the slide unit 5 is abutted against an abutment portion (not shown) attached in the vicinity of the insertion port. Accordingly, as shown in FIG. 10, the slide unit 5 is slid to the rear wall 22 side of the lower case 11 and located at a position P2 on the rear wall 22 side of the case main body 3. In this state, the insertion holes 51a of the slide unit 5 communicate with the insertion holes 21b of the lower case 11 as well as the cutout portion 21a of the bottom plate 21 of the lower case 11 is opened. Next, for example, the loading portion moves the information recording medium 1 toward the extreme ends of the drive shafts of the drive unit. At the time, the drive shafts are inserted into the central portions of the tape reels 2, 2 through the insertion holes 51a and 21b.

Next, as shown in FIG. 12, when the drive unit turns the front cover 6, the opening 12a of the upper case 12 is released. At the time, the projections 62a, 62a of the support portions 62, 62 of the front cover 6 are engaged with the projections 42a at the extreme ends of the arms 42, 42 of the reel brake 4 to thereby move the arms 42, 42 to the opening 12a side. With the above operation, the main portion 41 of the reel brake 4 is slid along the direction in which the main portion 41 separates from the tape reels 2, 2 against the urging force of the spring (not shown). Therefore, the teeth portions 2a of the tape reels 2, 2 are disengaged from the projections 41a, 41a of the main portion 41, thereby the regulated rotation of the tape reels 2, 2 is released. In this case, as shown in FIG. 12, the reel brake 4 is arranged such that the arms 42, 42 are moved along the direction in which they come into contact with and separate from the tape reels 2, 2 between the windows 26 of the lower case 11 and the windows 35 of the upper case 12. Thus, force necessary to turn the front cover 6 is reduced because the distance from the axis of rotation 6a of the support portions 62 of the front cover 6 to the projections 42a at the extreme ends of the arms 42, 42, on which the urging force of the spring applied the reel brake 4 acts, is shortened than that of the arrangement in which the arms 42, 42 are moved at positions nearer to, for example, the bottom plate 21 side than the windows 26. As a result, the front cover 6 can be smoothly turned.

Next, the magnetic tape T is abutted against a magnetic head by the drive unit as well as data is read out or written by rotating the tape reels 2, 2. Further, the tape end detector disposed to the drive unit detects the detection light. In this case, the detection light enters from the windows 26 of the lower case 11 of the case main body 3 and irradiated onto the magnetic tape T. Subsequently, when the magnetic tape T is wound around one tape reel and the magnetic tape T wound around the other tape reel reaches its end, the detection light passes through the leader tape attached to the end of the magnetic tape T, and the light path of the detection light is changed to the inverted-U-shape by the prism (not shown) disposed in the case main body 3, thereby the detection light outgoes to the outside of the case main body 3 through the windows 35 of the upper case 12. At the time, the tape end detector detects the detection light, and, in response to the detection of the light, the drive unit stops reading and writing data as well as stops the rotation of the tape reels 2, 2. Next, the drive unit separates the magnetic head from the magnetic tape T.

Next, the loading portion separates the information recording medium 1 from the extreme ends of the drive shafts. Subsequently, the drive unit turns the front cover 6 in a direction opposite to the direction described above, thereby the opening 12a of the upper case 12 is closed as shown in FIG. 11. At the time, as shown in FIG. 11, the projections 62b, 62b of the support portions 62 of the front cover 6 are engaged with the projections 42a at the extreme ends of the arms 42, 42 of the reel brake 4 to thereby move the arms 42, 42 to the tape reels 2, 2 side. With the above operation, the main portion 41 of the reel brake 4 is moved along the direction in which the main portion 41 is located in close proximity to the tape reels 2, 2. Accordingly, the projections 41a, 41a of the main portion 41 are engaged with the teeth portions 2a of the tape reels 2, 2 to thereby regulate the rotation of the tape reels 2, 2. Next, the loading portion pushes out the information recording medium 1 toward the outside of the insertion port. At the time, as shown in FIG. 9, the slide unit 5 is slid to the position P1 side, thereby the cutout portion 21a of the bottom plate 21 of the lower case 11 is closed. With this operation, the information recording medium 1 is placed in the state in which the information recording medium 1 can be taken out from the insertion port of the drive unit.

As described above, according to the information recording medium 1, the reel brake 4 is arranged such that the arms 42, 42 move, respectively along the direction in which they come into contact with and separate from the tape reels 2, 2 between the windows 26 of the lower case 11 and the windows 35 of the lower case 11. Accordingly, the distance from the axis of rotation 6a of the support portions 62 of the front cover 6 to the extremes ends of the arms 42, 42, on which the urging force of the spring applied to the reel brake 4 acts, can be shortened than the arrangement in which the arms are moved, for example, at positions nearer to the bottom plate 21 than the windows 26 of the lower case 11, thereby the force necessary to turn the front cover 6 can be reduced. As a result, the front cover 6 can be smoothly turned.

Figure 13:
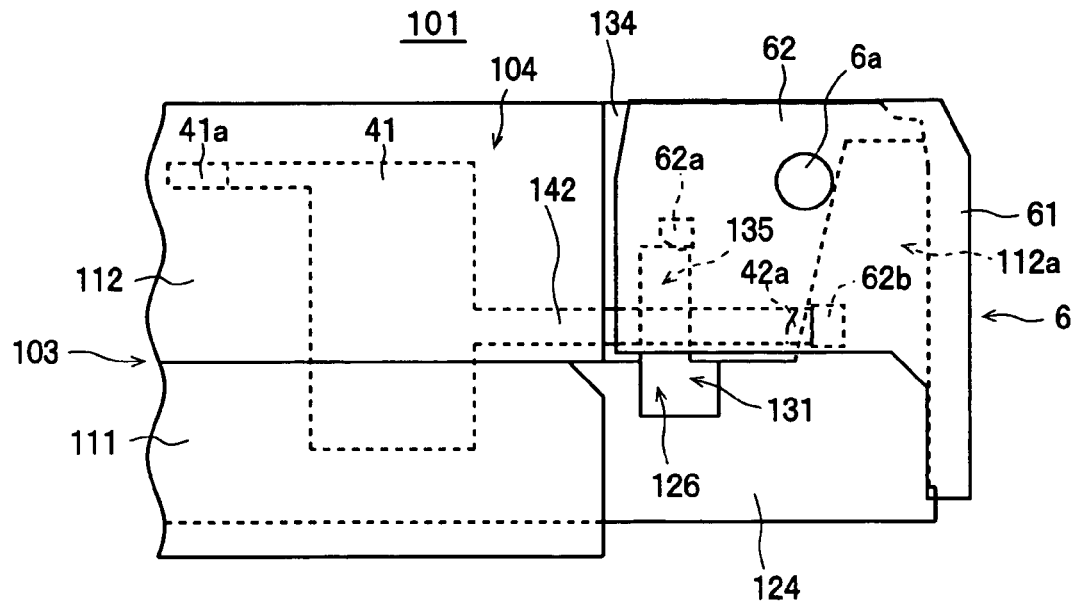
FIG. 13 is a side view of another information recording medium in an unused state.
Figure 14:
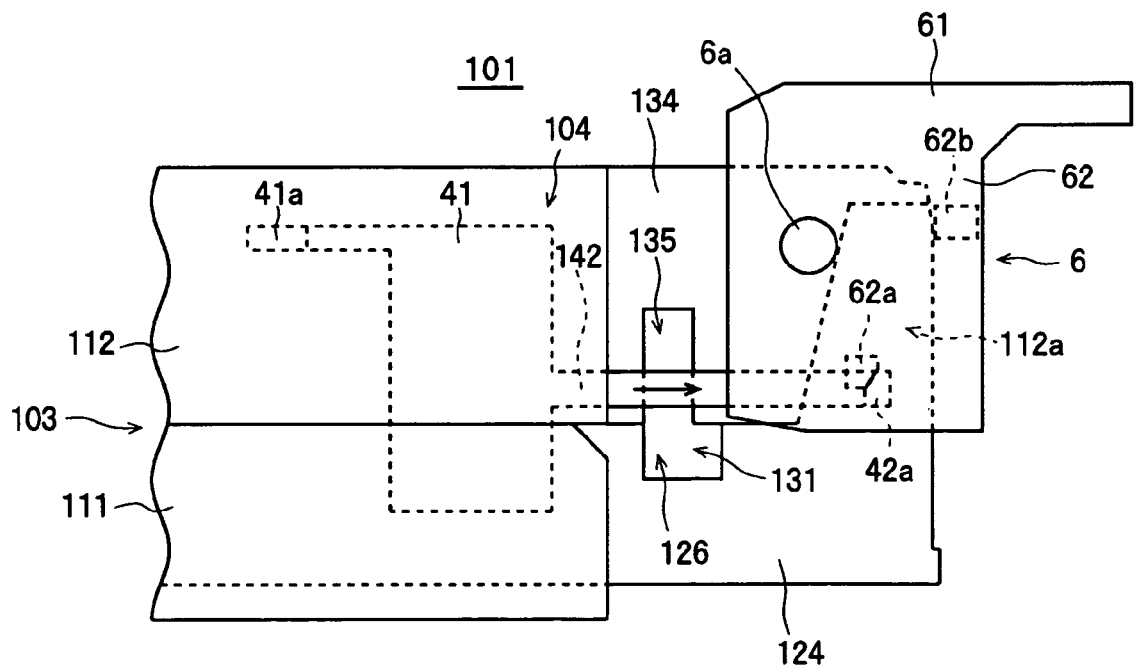
FIG. 14 is a side view of the another information recording medium in an used state.

Next, an information recording medium 101 shown in FIG. 1 will be explained. It should be noted that the present invention is basically applied to the information recording medium 101 likewise the information recording medium 1. Accordingly, in the information recording medium 101, the same components as those of the information recording medium 1 are denoted by the same reference numerals, and the duplicated description thereof is omitted. As shown in FIG. 1, the information recording medium 101 includes tape reels 2, 2 around which a magnetic tape T is wound, a case main body 103, a reel brake 104, a slide unit 5, and a front cover 6. The case main body 103 includes a lower case 111 and an upper case 112 which can be engaged with each other. As shown in FIG. 4, the lower case 111 includes a bottom plate 21, a rear wall 22, side walls 23, 23, side walls 124, 124, and a front wall 25. As shown in FIGS. 13 and 14, the side walls 124, 124 have cutout portions 126 formed thereto.

As shown in FIG. 5, the upper case 112 includes a top plate 31, a rear wall 32, side walls 33, 33, and side walls 134, 134. As shown in FIGS. 13 and 14, the side walls 134, 134 have cutout portions 135 formed thereto. When the upper case 112 is engaged with the lower case 111, the cutout portions 135 communicate with the cutout portions 126 to thereby form simple windows 131. In this case, the windows 131 correspond to the openings of the present invention and cause detection light outgoing from a tape end detector to enter the inside of the case main body 103 as well as causes the detection light to outgo to the outside of the case main body 103. In the information recording medium 101, the cutout portions 126 are formed to the side walls 124, 124 of the lower case 111 as described above in place of the holes constituting the windows 26 of the information recording medium 1. Further, the cutout portions 135 are formed to the side walls 134, 134 of the upper case 112 in place of the holes constituting the windows 35 of the information recording medium 1. Accordingly, when the lower case 111 and the upper case 112 are manufactured by, for example, injection molding, an ordinary metal mold having no slide core can be used different from the cases having the holes on the side walls thereof. In this case, the ordinary metal mold can be manufactured in a less expensive cost than a special slide metal mold having a slide core, thereby the manufacturing cost of the lower case 111 and the upper case 112 can be reduced.

As shown in FIG. 6, the reel brake 104 includes a main portion 41 and arms 142, 142. In this case, as shown in FIGS. 13 and 14, the length and the position of the arms 142, 142 are defined such that they move, respectively along a direction in which they come into contact with and separate from the tape reels 2, 2 so as to cross the central portions of the windows 131 of the case main body 3 in the vertical direction thereof (thickness direction) as the front cover 6 is turned. That is, the length and the position of the arms 142, 142 are defined such that they move so as to cross the central portions of the windows 131 of the case main body 3 in the vertical direction thereof at the positions where first regions and second regions are partitioned from one another in the windows 131 of the present invention. In this case, the regions in the lower case 111, out of the first regions and the second regions, which are partitioned by the arms 142, of the windows 131, correspond to the first regions of the present invention and have a function similar to the windows 26 of the information recording medium 1. The regions in the upper case 112, out of the first regions and the second regions of the windows 131, correspond to the second regions of the present invention and have a function similar to the windows 35 of the information recording medium 1. Further, the first regions in the lower case 111 are light blockingly partitioned from the second regions in the upper case 112 by the arms 142 so that the detection light entering the first regions in the lower case 111 regions does not directly enters the second regions in the upper case 112.

When the information recording medium 101 is not used, the rotation of the tape reels 2, 2 is regulated by the reel brake 104 likewise the information recording medium 1. As shown in FIG. 13, the front cover 6 closes an opening 112a of the upper case 112 of the case main body 103. In contrast, when the information recording medium 101 is loaded on a loading portion of a drive unit, the drive unit turns the front cover 6 as shown in FIG. 14. At the time, the arms 142, 142 of the reel brake 104 are moved to the front surface side of the information recording medium 101 as the front cover 6 is turned, thereby the regulated rotation of the tape reels 2, 2 is released. In this case, as shown in FIG. 14, the reel brake 104 is arranged such that the reel brake 104 moves along the direction in which the reel brake 104 comes into contact with and separates from the tape reels 2, 2, respectively across the central portions of the windows 131 of the case main body 3 in the vertical direction thereof. Accordingly, force necessary to turn the front cover 6 can be reduced likewise the information recording medium 1, thereby the front cover 6 can be smoothly turned.

Next, when the drive unit begins to read or write data, the tape end detector of the drive unit causes the detection light to outgo. In this case, the detection light enters from, for example, the regions in the lower case 111 out of the first regions and the second regions, which are partitioned by the arms 142, of the windows 131 and is irradiated onto the magnetic tape T. Next, when the magnetic tape T is wound around one of the tape reels 2, the detection light passes through a leader tape, the light path of the detection light is changed to an inverted-U-shape by a prism, and the detection light outgoes from the regions in the upper case 112 out of the first regions and the second regions of the windows 131 to the outside of the case main body 103. At the time, the tape end detector receives the detection light, thereby the drive unit stops the rotation of the tape reels 2, 2. Thereafter, the drive unit operates in the same manner as that described above, the information recording medium 101 can be taken out from an insertion port of the drive unit.

As described above, according to the information recording medium 101, since the reel brake 104 is arranged such that the arms 142, 142 move, respectively along the direction in which they come into contact with and separate from the tape reels 2, 2 at the positions where they cross the central portions of the windows 131 of the case main body 3 in the vertical direction thereof, the windows 131, which have the function for causing the detection light to enter and to outgo can be composed of the cutout portions 126 and the cutout portions 135. Accordingly, when the lower case 111 and the upper case 112 are formed by, for example, injection molding, the ordinary metal mold having no slide core can be used. Since the ordinary metal mold can be manufactured in a less expensive cost than the special slide metal mold having the slide core, the manufacturing cost of the lower case 111 and the upper case 112 can be reduced, thereby the manufacturing cost of the information recording medium 101 can be reduced.

The present invention is by no means limited to the above arrangements. In the information recording medium 1 described above, for example, the windows 26 are formed to the side walls 24, 24 of the lower case 11, and the windows 35 are formed to the side walls 34, 34 of the upper case 12. However, both the windows 26 and 35 may be formed to the side walls 24, 24 of the lower case 11 or to the side walls 34, 34 of the upper case 12. Further, although the windows 26 and 35 are formed of the holes in the information recording medium 1, any ones of the windows 26 and 35 may be formed of cutout portions. Although the windows 131 are formed of the two cutout portions 126 and the two cutout portions 135 in the information recording medium 101, the windows 131 may be formed of the cutout portions formed only to the side walls 124 of the lower case 111 or to the side walls 134 of the upper case 112.

Although the information recording medium 1 used to back up data recorded to the computer has been exemplified in the above description, the information recording medium according to the present invention also includes various types of information recording media such as an information recording medium used to record image data, an information recording medium used to record audio data, and the like.

What is claimed is:

1. An information recording medium comprising:
    a pair of tape reels around which a magnetic tape is wound;
    a case main body having first windows and second windows formed to the side walls thereof and rotatably accommodating the pair of tape reels therein, wherein the first windows cause detection light to enter the inside of the case main body to detect the tape ends of the magnetic tape, and the second windows cause the detection light to outgo to the outside of the case main body;
    a front cover turnably attached to the case main body to open and close a drawing-out port of the magnetic tape; and
    a reel brake,
    wherein the reel brake comprises:
    a main body disposed to the case main body so as to slide along a direction in which the main body comes into contact with and separates from the tape reels; and
    arms formed to the main body as well as sliding the main body by engaging with the front cover and moving along the direction in which the main body slides, the arms further moving between both the first and second windows as the front cover is turned to thereby regulate the rotation of the tape reels and release the regulated rotation of the tape reels.

2. An information recording medium according to claim 1, wherein the first window and the second window form a simple opening in association with each other, and the reel brake is arranged such that the arms move along the direction in which they come into contact with and separate from the tape reels at the position where the opening is partitioned to a first region acting as the first window and a second region acting as the second window.

* * * * *